United States Patent
Reynolds

(10) Patent No.: US 9,106,809 B2
(45) Date of Patent: *Aug. 11, 2015

(54) FIREARMS PULVERIZER SYSTEM AND METHOD

(71) Applicant: Gunbusters, LLC, Chesterfield, MO (US)

(72) Inventor: Raymond W Reynolds, Chesterfield, MO (US)

(73) Assignee: GUNBUSTERS, LLC, Chesterfield, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/520,132

(22) Filed: Oct. 21, 2014

(65) Prior Publication Data

US 2015/0054948 A1    Feb. 26, 2015

Related U.S. Application Data

(63) Continuation of application No. 13/896,146, filed on May 16, 2013, now Pat. No. 8,890,944.

(51) Int. Cl.
| | | |
|---|---|---|
| H04N 9/47 | (2006.01) | |
| H04N 7/18 | (2006.01) | |
| F41A 19/00 | (2006.01) | |
| F41C 23/00 | (2006.01) | |
| F41C 23/02 | (2006.01) | |
| F41A 29/00 | (2006.01) | |
| F41A 33/00 | (2006.01) | |
| F41G 3/26 | (2006.01) | |
| H04N 5/77 | (2006.01) | |
| H04N 9/79 | (2006.01) | |

(52) U.S. Cl.
CPC . *H04N 7/18* (2013.01); *H04N 5/77* (2013.01); *H04N 5/772* (2013.01); *H04N 9/79* (2013.01)

(58) Field of Classification Search
USPC .......... 348/61, 64, 73, 135, 142, 159; 434/11, 434/16, 17, 18, 19, 24; 42/84, 85, 95, 106
See application file for complete search history.

(56) References Cited

U.S. PATENT DOCUMENTS

| | | | |
|---|---|---|---|
| 2006/0250497 A1* | 11/2006 | Inbar et al. | 348/31 |
| 2008/0121097 A1* | 5/2008 | Rudakevych et al. | 89/28.05 |
| 2011/0175727 A1* | 7/2011 | Aikaterinidis | 340/540 |
| 2012/0069224 A1* | 3/2012 | Cilia et al. | 348/240.99 |

* cited by examiner

*Primary Examiner* — Daquan Zhao
(74) *Attorney, Agent, or Firm* — David H. Chervitz

(57) ABSTRACT

A firearms pulverizer system is disclosed which comprises a pulverizer unit having an inlet chute, a cutting chamber, and an outlet, a first image capturing device positioned above the inlet chute for capturing an image of an identification number associated with a firearm, and a second image capturing device positioned above the cutting chamber for recording destruction of the firearm inserted into the cutting chamber.

20 Claims, 4 Drawing Sheets

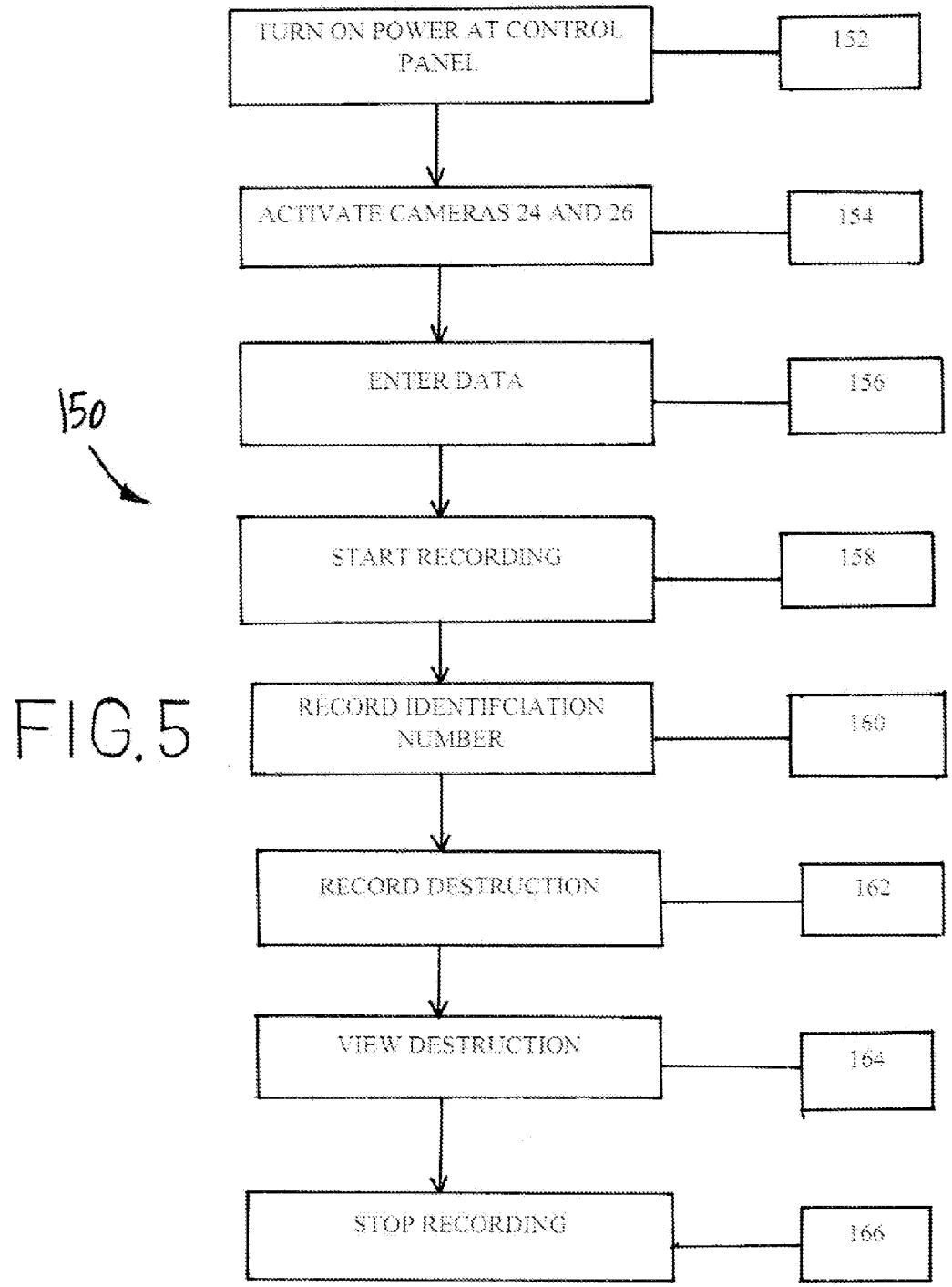

FIREARMS PULVERIZER SYSTEM AND METHOD

CROSS REFERENCE TO RELATED APPLICATIONS

This application is a continuation of U.S. patent application Ser. No. 13/896,146, which was filed on May 16, 2013, which is now U.S. Pat. No. 8,890,944.

BACKGROUND

This disclosure relates to a system and method for destroying a firearm and more particularly to a firearms pulverizer system and method for destroying a firearm and authenticating and recording the destruction of the firearm.

Every year numerous firearms are confiscated, surrendered, or seized by law enforcement agencies. While seizure and recovery numbers are not published, public ATF (Bureau of Alcohol, Tobacco, Firearms, and Explosives) data reflects over 344,000 traces of "crime guns", were conducted in 2012, while over 6 million firearm serial numbers were checked by agencies. It is estimated that over a million guns are recovered annually by law enforcement, not including those obtained through agency buy-back programs. Once the law enforcement agency no longer has a need to hold onto a confiscated or surrendered firearm, the firearm may be destroyed.

In some agencies, seized guns are destroyed by sawing in-half or cutting with an acetylene torch. Other agencies destroy guns by crushing the gun with a sledge hammer. All of these methods are inherently dangerous tasks. A few agencies transport weapons to car shredders or foundries with an increased risk of loss or theft during the process. It is known that car shredders discharge large hunks of steel through which a small firearm may emerge unscathed by the process. Some steel mills are no longer melting guns due to liability issues and environmental concerns. Since firearms may contain materials such as lead residue, cleaning chemicals, plastic, and treated wood parts, destruction of firearms may release potentially harmful chemicals when burned. As can be appreciated, there are sizable hidden costs for agencies that destroy firearms. For example, there are costs incurred for the packaging, shipping, storing, record-keeping, and eventual destruction of seized firearms. Some agencies, due to budgetary constraints, are not able to destroy firearms and must store or warehouse the confiscated weapons. A number of agencies recently increased the size of their storage rooms to store recovered firearms. Since the firearms are stored and not destroyed, there is the possibility of the firearms being misplaced or lost.

Further, once a firearm is destroyed, there is typically no record of the destruction of the firearm. For example, each firearm includes a unique identification number such as a serial number or an evidence identification number. However, once destroyed, there is no way to authenticate which firearm was destroyed or to check against a database to determine if a firearm had ever been destroyed.

Therefore, it would be desirable to have a firearms pulverizer system that quickly and easily destroys a firearm, authenticates the firearm being destroyed, and records the destruction of the firearm. It would be advantageous to have a firearms pulverizer system that is mobile and can be transported to an agency's storage facility. It would also be advantageous to have a firearms pulverizer system that can provide a database of destroyed firearms for checking against other weapons databases.

SUMMARY

In one form of the present disclosure, a firearms pulverizer system is disclosed which comprises a pulverizer unit having an inlet chute, a cutting chamber, and an outlet, a first image capturing device positioned above the inlet chute for capturing an image of an identification number associated with a firearm, and a second image capturing device positioned above the cutting chamber for recording destruction of the firearm inserted into the cutting chamber.

In another form of the present disclosure, a firearms pulverizer system comprises a pulverizer unit having an inlet chute for having a firearm inserted therein, a cutting chamber capable of destroying the inserted firearm, and an outlet for discharging the destroyed firearm, a first image capturing device positioned above the inlet chute for capturing an image of an identification number associated with the firearm, a second image capturing device positioned above the cutting chamber for recording destruction of the firearm inserted into the cutting chamber, and a shield for protecting the first image capturing device and the second image capturing device.

In yet another form of the present disclosure, a method for destroying a firearm is disclosed which comprises the steps of providing a pulverizer unit having an inlet chute, a cutting chamber, and an outlet, a first image capturing device positioned above the inlet chute for capturing an image of an identification number associated with a firearm, and a second image capturing device positioned above the cutting chamber for recording destruction of the firearm inserted into the cutting chamber.

In light of the foregoing comments, it will be recognized that the present disclosure provides a system and method for destroying a firearm.

The present disclosure provides a firearms pulverizer system and method for authenticating a firearm being destroyed and for recording the destruction of the firearm.

The present disclosure provides a firearms pulverizer system and method which is mobile and may be transported to an agency's storage facility for use and operation.

The present disclosure provides a firearms pulverizer system and method that provides a database of destroyed firearms with the database being used to check against other weapons databases.

The present disclosure provides a firearms pulverizer system that enables a law enforcement agency to easily, safely, efficiently, and cost-effectively destroy confiscated, surrendered, or seized firearms.

These and other advantages of the present firearms pulverizer system and method will become apparent after considering the following detailed specification in conjunction with the accompanying drawings, wherein:

BRIEF DESCRIPTION OF THE DRAWINGS

FIG. 5 is flow chart diagram of an operation of the firearms pulverizer system of the present disclosure.

DETAILED DESCRIPTION OF THE PREFERRED EMBODIMENTS

Figure 1:
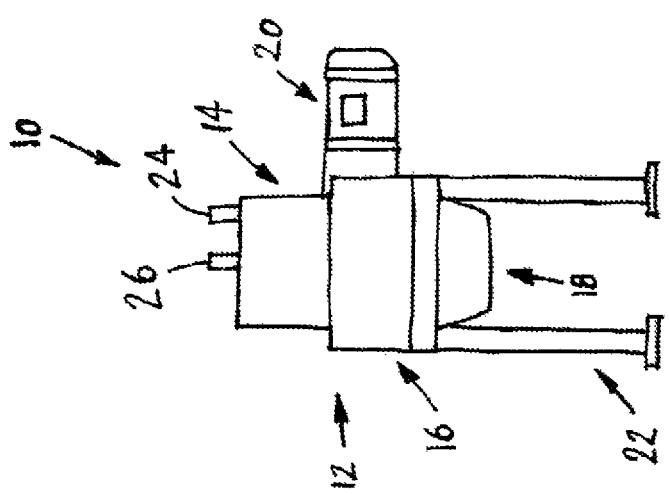
FIG. 1 is a side perspective view of a firearms pulverizer system constructed according to the present disclosure.

Referring now to the drawings, wherein like numbers refer to like items, number 10 identifies a firearms pulverizer system constructed according to the present disclosure. With reference now to FIG. 1, the system 10 is shown to comprise a pulverizer unit 12 having an inlet chute 14, a cutting chamber 16, and an outlet 18. The pulverizer unit 12 may include a drive assembly 20 for operating the cutting chamber 16. Although not shown, the pulverizer unit 12 may have a control panel for powering the unit 12 on and off. The drive assembly 20 may be a dual electric drive assembly operated by electric motors. The pulverizer unit 12 may be positioned on a base unit 22. The base unit 22 may be positioned directly on the ground and anchored into the ground. It is also possible and contemplated that the base unit 22 may be positioned on a pallet, wheels, or a wheeled assembly to allow the firearms pulverizer system 10 to be mobile. For example, there may be situations where one law enforcement agency only has a need for the destruction of firearms once a year. In this situation, the firearms pulverizer system 10 may be transported to the law enforcement agency for use and once all of the firearms are destroyed the system 10 may be transported to a different law enforcement agency for use.

The firearms pulverizer system 10 also comprises a first image capturing device or camera 24 positioned above the inlet chute 14. The first image capturing device 24 is used for capturing an image of an identification number associated with a firearm, as will be explained in detail further herein. A second image capturing device or camera 26 is positioned above the cutting chamber 16 for recording destruction of a firearm inserted into the cutting chamber 16. An example of the devices 24 and 26 may be a camera such as a Logitech HD webcam c615.

Figure 2:
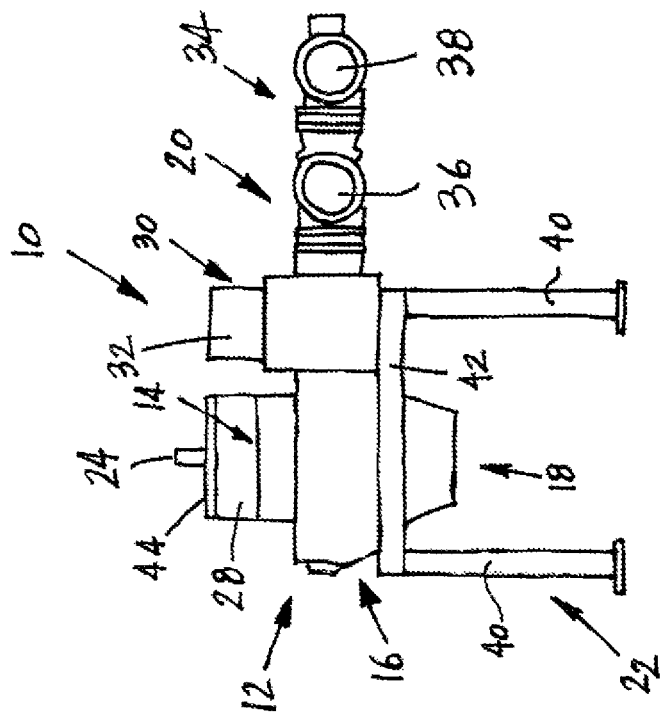
FIG. 2 is a front perspective view of the firearms pulverizer system shown in FIG. 1 constructed according to the present disclosure.

With reference now to FIG. 2, a front perspective view of the firearms pulverizer system 10 is shown. The firearms pulverizer system 10 comprises the pulverizer unit 12 having the inlet chute 14, the cutting chamber 16, and the outlet 18. The inlet chute 14 has a door 28 through which a firearm (not shown) may be placed to have the firearm sent to the cutting chamber 16. Although not shown, the door 28 may have a handle to facilitate opening or closing of the door 28. The firearm pulverizer system 10 also comprises a computer system 30 that is connected to the first image capturing device 24. The computer system 30 is also connected to the second image capturing device 26, however, the second image capture device 26 is not shown in this particular view because the device 24 is blocking the device 26. The connection between the computer system 30 and the devices 24 and 26 may be wired or wireless. The computer system 30 has a screen 32 upon which various operation screens may be presented, as will be discussed further herein. By way of example, the computer system 30 may be a computer having a microprocessor, memory, a hard drive having stored thereon an operating system and other software programs, input devices such as a mouse or a touch screen, a DVD Multi-recorder drive, and a floppy disk drive. The computer system 30 may also include other ancillary devices such as a printer, a scanner, a modem, a router, or other network devices that allow the computer system 30 to be connected to a network or the Internet. It is also possible that the computer system 30 may be a laptop computer, a smart phone, an iPod touch, a personal digital assistant (PDA), an iPad, tablet, an Android based tablet, a device that has WiFi connectivity, or other mobile communications device capable of sending and receiving data over a wireless network. It is also possible that the computer system 30 may use various connections to send data or information to a secured facility and the connections may take on various forms such as a telephone line, cable, ISDN lines, fiber optic lines, wireless connections, microwave, radio, satellites, or military or law enforcement secured lines.

The pulverizer unit 12 also includes the drive assembly 20 for operating the cutting chamber 16. The drive assembly 20 has a dual electric drive assembly 34 operated by a first electric motor 36 and a second electric motor 38. The pulverizer unit 12 may be positioned on the base unit 22. The base unit 22 may be constructed of steel legs 40 and steel cross members 42 that are used to support the pulverizer unit 12. As can be appreciated, the pulverizer unit 12 and the base unit 22 are constructed of very sturdy components to provide for safe use and long life of the system 10.

The first image capturing device 24 is positioned over the inlet chute 14 and the door 28 on top of a shield 44. The shield 44 may be clear to allow the first image capturing device 24 to be able to view a firearm being placed into the inlet chute 14. The shield 44 may be plexiglass, safety glass, tempered glass, clear plastic, or any other clear material that will protect the first image capturing device 24 from any piece of a firearm that is being destroyed by the system 10. Although not shown in this particular view, the second image capturing device 26 is also positioned on the shield 44 and this allows the second image capturing device 26 to view a firearm being destroyed within the cutting chamber 16. Once a firearm is destroyed, the remnants of the firearm are discharged out of the outlet 18. A container or tray (both not shown) may be placed beneath the outlet 18 for capturing and storing any remnants. The remnants may be disposed of or sold as scrap.

Figure 3:
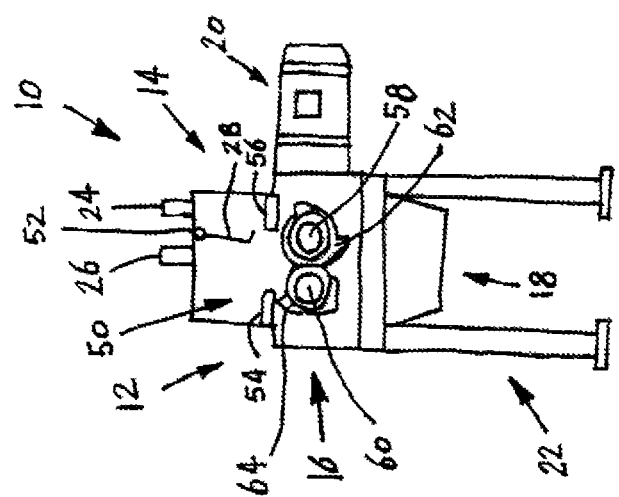
FIG. 3 is a side perspective view of the firearms pulverizer system with a side panel removed to illustrate the interior of the system.

FIG. 3 is a side perspective view of the firearms pulverizer system 10 with a side removed for illustrating an interior 50 of the inlet chute 14 and the cutting chamber 16. The inlet chute 14 has the door 28 that is connected to a hinge 52 to allow the door 28 to be pushed open to allow a firearm to fall into the cutting chamber 16. The inlet chute 14 has a pair of ledges 54 and 56 that guide or feed a firearm into the cutting chamber 16. The ledges 54 and 56 may be coated with a plastic such as UHMW (ultra high molecular weight) plastic to facilitate movement of a firearm from the inlet chute 14 into the cutting chamber 16. The ledges 54 and 56 may also be angled to further direct a firearm into the cutting chamber 16. The cutting chamber 16 has a first rotatable shaft 58 that is actuated by the first electric motor 36 (not shown) of the drive assembly 20 and a second rotatable shaft 60 that is actuated by the second electric motor 38 (not shown) of the drive assembly 20. The first rotatable shaft 58 has a number of cutter blades or hammer elements 62 mounted to the shaft 58. The cutter blades or hammer elements are used to pulverize or destroy a firearm inserted into the cutting chamber 16. The second rotatable shaft 60 also has a number of cutter blades or hammer elements 64 mounted to the shaft 60. Although not shown in any detail, there are a number of other elements that may be mounted to the shafts 58 and 60 to facilitate pulverizing or destroying a firearm inserted into the cutting chamber 16. An example of a suitable pulverizer unit 12 is a machine manufactured by American Pulverizer Company of St. Louis, Mo. identified as model number 24X25 EG HD TRS.

Figure 4:
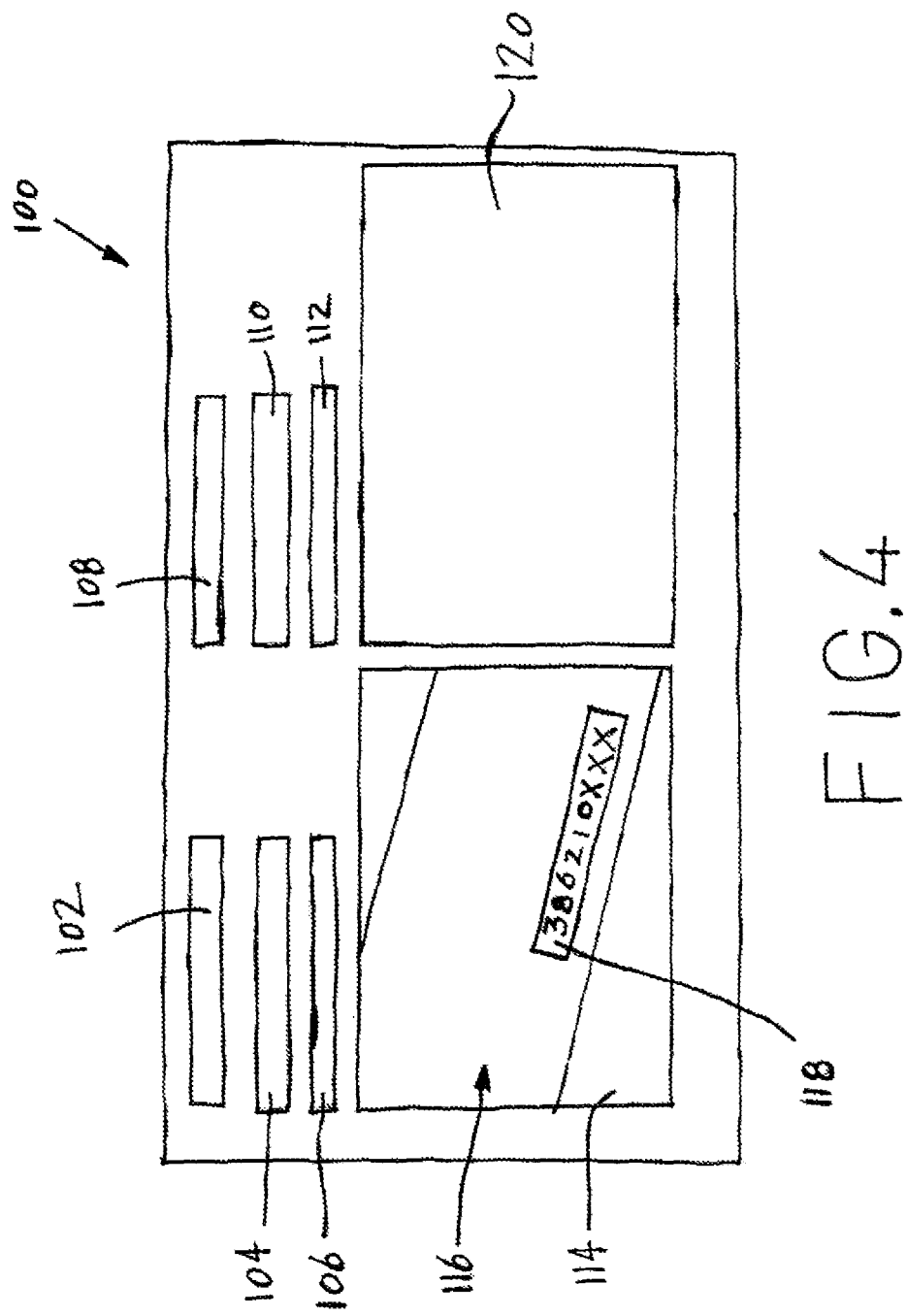
FIG. 4 is an illustration of a screen which may be presented during use of the firearms pulverizer system constructed according to the present disclosure.

With reference now to FIG. 4, a screen 100 is shown which may be displayed on the screen 32 of the computer system 30. The computer system 30 may have a software program or an application installed that allows an operator of the system 10 to control operation of the system 10 and to view the screen 100. The screen 100 has a first box 102 in which information such as the name of an operator may be inserted. A second box 104 is provided in which information such as the name of the law enforcement agency may be typed in to identify the agency using the system 10. A third box 106 may be provided to have the serial number or evidence number of the firearm that is being destroyed. Firearms are typically stamped with a unique weapon number or serial number into the frame or the butt of the firearm for the purpose of tracking ownership and/or use of the firearm. If the firearm being destroyed has a serial number then this can be inputted into the box 106. It is also possible that the firearm does not have a serial number due to the age of the firearm or that the serial number was removed from the firearm. In this case, the law enforcement agency may assign an evidence number or other identification number to the firearm. An operator may input the evidence number into the box 106. A fourth box 108 may be provided to insert a name of a witness viewing the destruction of the firearm. A fifth box 110 may have the directory name to which the recording of the serial number of the firearm and of the destruction of the firearm are being saved to on the computer system 30. A sixth box 112 is used to indicate the date and time of the destruction of the firearm. This box 112 will provide a continuous time stamp of the destruction process. A first video box 114 is used to record the identification number associated with the firearm to be destroyed that is received from the first image capturing device 24. For example, an operator positions a firearm 116 having an identification number 118 in the inlet chute 14 below the first image capturing device 24. The device 24 captures the image of the identification number 118 and this is displayed in the first video box 114 as a continuous video. Once an operator has successfully captured the identification number 118, an operator will allow the firearm 116 to fall into the cutting chamber 16 through the door 28. As the firearm 116 is falling into in the cutting chamber 16 from the inlet chute 14, the second image capturing device 26 takes a continuous video of the destruction of the firearm 116 proceeding from the inlet chute 14 into the cutting chamber 16 until the firearm 116 is destroyed. This video is displayed in a second video box 120. As can be appreciated, various other boxes may be presented in the screen 100. For example, other boxes may have inputted information such as a name of a department destroying the firearm 116, the location of the destruction of the firearm, or a name of another witness. Also, drop down menus, buttons, or other selection devices may be included in the screen 100 to select various other options. Other screens may be included in the application or the software such as a start screen, a help screen, a playback screen, and a log off screen to facilitate operation of the system 10 or the program.

FIG. 5 illustrates a flowchart diagram 150 of the general operation of the system 10. In an initial step 152, an operator turns on power of the pulverizer unit 12 at the control panel. Once power is turned on, in a next step 154, an operator activates the first image capturing device 24 and the second image capturing device 26 associated with the system 10 and the computer system 30. An operator can verify activation of the devices 24 and 26 by viewing the screen 100 in which the first video box 114 will have an image of the inlet chute 14 and the second video box 120 will have an image of the cutting chamber 16. In a next step 156, an operator enters information into the various boxes 102, 104, 106, 108, 110, and 112 of the screen 100. For example, an operator may use a keyboard of the computer system 30 to type in the identification number 118 of the firearm 116 that is to be destroyed by the system 10 into the box 106. Other methods of inputting information are possible and contemplated such as the screen 32 being a touch screen and touching the box 106 will open up a sub-screen in which a keyboard is presented to type in the identification number 118 of the firearm 116. Once the information is entered, an operator will then start the recording of the destruction event by pressing a key on a keyboard such as a function key. Other methods of initiating the recording by the devices 24 and 26 are possible. For example, a button may be provided on the screen 100 and a mouse may be used to click on the button or an operator may simply press the button if the screen 32 is a touch screen. The initiation of the devices 24 and 26 is accomplished in a step 158. In a next step 160, an operator will position the firearm 116 underneath the first image capturing device 24 to capture an image of the identification number 118. An operator can verify that the first image capturing device 24 by viewing the first video box 114 of the screen 100. Once an operator is satisfied that the identification number 118 has been successfully captured and is being recorded by the system 10, an operator will operate the door 28 to allow the firearm 116 to fall down into the cutting chamber 16 to be destroyed with the destruction being recorded by the second image capturing device 26. This all occurs in a step 162. Next, in a step 164, an operator may safely view the destruction of the firearm 116 by viewing the second video box 120. This also allows an operator to verify that the firearm 116 has been destroyed. An operator, in a step 166, then stops the recordings being performed by the devices 24 and 26 by selecting a predetermined key or box associated with the screen 100. As can be appreciated, the destruction of the firearm 116 is accomplished in one continuation operation and the recording of the destruction is one continuation operation. This prevents a fraudulent event from occurring. For example, if an operator wanted to fake the destruction of a firearm in an attempt to steal the firearm by changing one firearm for another after the identification number was recorded, such an event would be prevented by the system 10 due to the continuous recording of the destruction of the firearm 116. To destroy the next firearm, an operator returns to step 154 and enters data associated with the next firearm. Once all of the firearms to be destroyed have been destroyed by use of the system 10, an operator may transfer the recordings of all of the destroyed firearms to a disk, a flash drive, a thumb drive, a DVD, a CD, or as a file attached to an e-mail. Although not discussed, it is possible that other steps may be incorporated into the process. For example, for safety reasons, an operator may use safety glasses and hearing protection prior to operating the system 10.

Figure 6:
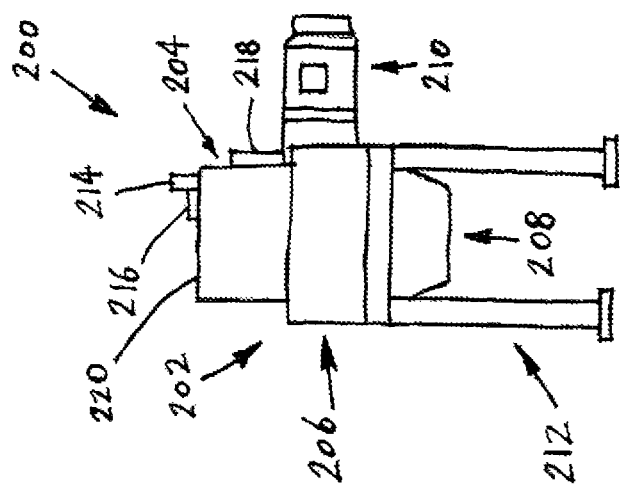
FIG. 6 is a side perspective view of another embodiment of a firearms pulverizer system constructed according to the present disclosure.

With reference now to FIG. 6, another embodiment of a firearms pulverizer system 200 is shown. The system 200 comprises a pulverizer unit 202 having an inlet chute 204, a cutting chamber 206, and an outlet 208. The pulverizer unit 202 may include a drive assembly 210 for operating the cutting chamber 206. The drive assembly 210 may be a dual electric drive assembly operated by electric motors. The pulverizer unit 202 may be positioned on a base unit 212. The base unit 212 may be positioned directly on the ground and anchored into the ground. It is also possible and contemplated that the base unit 212 may be positioned on a pallet, wheels, or a wheeled assembly to allow the firearms pulverizer system 200 to be mobile. As previously indicated, an example of a suitable pulverizer unit 202 is a machine manufactured by American Pulverizer Company of St. Louis, Mo. identified as model number 24X25 EG HD TRS.

The firearms pulverizer system 200 also comprises an image capturing device or camera 214 that is capable of being positioned above the inlet chute 204 and repositioned above the cutting chamber 206. The image capturing device 214 is used for capturing an image of an identification number associated with a firearm and for recording destruction of a firearm inserted into the cutting chamber 206. An example of the camera 214 that may used is a Logitech HD webcam c615. The camera 214 may be attached to a sliding mechanism 216 that allows the camera 214 to be moved from a first position over the inlet chute 204 to a second position over the cutting chamber 206. In the first position over the inlet chute 204, an operator is able to record the identification number associated with a firearm. When the camera 214 is moved to the second position, the camera is capable of recording the destruction of a firearm placed into the cutting chamber 206. It is also possible that the sliding mechanism 216 may not be used and that the camera 214 may just be moved from the first position over the inlet chute 204 to the second position over the cutting chamber 206 and back.

The system 200 also comprises a computer system 218 that is connected to the image capturing device 214. The connection between the computer system 218 and the camera 214 may be wired or wireless. The computer system 218 may have a screen (not shown) upon which various operation screens may be presented, such as the previously discussed screen 100. By way of example, the computer system 218 may be a computer having a microprocessor, memory, a hard drive having stored thereon an operating system and other software programs, input devices such as a mouse or a touch screen, a DVD Multi-recorder drive, and a floppy disk drive. The computer system 218 may also include other ancillary devices such as a printer, a scanner, a modem, a router, or other network devices that allow the computer system 218 to be connected to a network or the Internet. It is also possible that the computer system 218 may be a laptop computer, a smart phone, an iPod touch, a personal digital assistant (PDA), an iPad, tablet, an Android based tablet, a device that has WiFi connectivity, or other mobile communications device capable of sending and receiving data over a wireless network. It is also possible that the computer system 218 may use various connections to send data or information to a secured facility and the connections may take on various forms such as a telephone line, cable, ISDN lines, fiber optic lines, wireless connections, microwave, radio, satellites, or military or law enforcement secured lines.

The image capturing device 214 is positioned over the inlet chute 204 and over a shield 220. The shield 220 is clear to allow the image capturing device 214 to be able to view a firearm being placed into the inlet chute 204 to record an identification number associated with a firearm to be destroyed and to view a firearm being destroyed in the cutting chamber 206 when the device 214 is repositioned over the cutting chamber 206. The shield 220 may be plexiglass, safety glass, tempered glass, clear plastic, or any other clear material that will protect the image capturing device 214 from being impacted by any piece of a firearm that is being destroyed by the system 200.

The operation of the system 200 is similar to the operation of the system 10 with the following noted exceptions. Once an identification number of a firearm to be destroyed is captured and recorded by the camera 214 and this is verified by viewing the first video box 114 of the screen 100, the camera 214 is repositioned over the cutting chamber 206 and this is verified by viewing the second video box 120 of the screen 100. Once an operator verifies that the camera 214 is recording the cutting chamber 206, an operator can drop a firearm to be destroyed through the inlet chute 204 to be destroyed in the cutting chamber 206. The camera 214, which is now positioned over the cutting chamber 206, will record the destruction of a firearm. Once a firearm is destroyed, any remnants will be discharged by the outlet 208. A container (not shown) may be placed beneath the outlet 208 for capturing, collecting, and storing any remnants for further disposal or sale. When another firearm needs to be destroyed, the camera 214 is moved back to over the inlet chute 204 and the process is repeated again.

It is possible that once a recording of all of the firearms that are required to be destroyed has been completed, by use of the system 10 or the system 200, a database of the identification numbers or the evidence numbers may be compiled for later use. For example, a crime may be committed in a jurisdiction and a firearm is found at the crime scene. An identification number associated with the firearm found at the crime scene can be entered into a database to determine if it matches an identification number associated with a firearm that has been destroyed. If there is a match between a previously destroyed identification number and an identification number found on a firearm used in a crime then it may be determined that the identification number for the firearm used in a crime may be an erroneous identification number. Further, since the destruction of a firearm has been recorded, a law enforcement agency may review the recording to determine if an error has occurred. It is further possible that the database created by use of the system 10 or the system 200 may be used to provide statistics of destroyed firearms for use by various law enforcement agencies.

From all that has been said, it will be clear that there has thus been shown and described herein a firearms pulverizer system and method which fulfills the various advantages sought therefore. It will become apparent to those skilled in the art, however, that many changes, modifications, variations, and other uses and applications of the subject firearms pulverizer system and method are possible and contemplated. All changes, modifications, variations, and other uses and applications which do not depart from the spirit and scope of the disclosure are deemed to be covered by the disclosure, which is limited only by the claims which follow.

What is claimed is:

1. A firearms pulverizer system comprising:
   a pulverizer unit having an inlet chute, a cutting chamber, and an outlet; and
   an image capturing device positioned above the inlet chute to capture an image of an identification number associated with a firearm and movable to be positioned above the cutting chamber to record destruction of the firearm inserted into the cutting chamber.

2. The firearms pulverizer system of claim 1 further comprising a computer connected to the image capturing device for receiving the image of the identification number associated with the firearm.

3. The firearms pulverizer system of claim 1 further comprising a computer connected to the image capturing device for receiving the recording of the destruction of the firearm inserted into the cutting chamber.

4. The firearms pulverizer system of claim 1 further comprising a sliding mechanism for moving the image capturing device from a first position over the inlet chute to a second position over the cutting chamber.

5. The firearms pulverizer system of claim 1 further comprising a video screen connected to the image capturing device for displaying the image of the identification number associated with the firearm.

6. The firearms pulverizer system of claim 1 further comprising a video screen connected to the image capturing device for displaying the recording of the destruction of the firearm.

7. The firearms pulverizer system of claim 1 wherein the pulverizer unit is a mobile unit.

8. The firearms pulverizer system of claim 1 further comprising a computer connected to the image capturing device, the computer for receiving the image of the identification number from the image capturing device and for storing the image and for receiving the recording of the destruction of the firearm from the image capturing device and for storing the recording.

9. A firearms pulverizer system comprising:
- a pulverizer unit having an inlet chute for having a firearm inserted therein, a cutting chamber capable of destroying the inserted firearm, and an outlet for discharging the destroyed firearm;
- an image capturing device positioned above the inlet chute to capture an image of an identification number associated with the firearm and movable to be positioned above the cutting chamber to record destruction of the firearm inserted into the cutting chamber; and
- a shield for protecting the image capturing device.

10. The firearms pulverizer system of claim 9 wherein the image capturing device is mounted to the shield.

11. The firearms pulverizer system of claim 9 further comprising a computer connected to the image capturing device for receiving the image of the identification number associated with the firearm.

12. The firearms pulverizer system of claim 9 further comprising a computer connected to the image capturing device for receiving the recording of the destruction of the firearm inserted into the cutting chamber.

13. The firearms pulverizer system of claim 9 further comprising a computer connected to the image capturing device, the computer for receiving the image of the identification number from the image capturing device and for storing the image and for receiving the recording of the destruction of the firearm from the image capturing device and for storing the recording.

14. The firearms pulverizer system of claim 9 further comprising a video screen connected to the image capturing device for displaying the image of the identification number associated with the firearm.

15. The firearms pulverizer system of claim 9 wherein the shield is a plexiglass shield.

16. A method for destroying a firearm comprising the steps of providing a pulverizer unit having an inlet chute, a cutting chamber, an outlet, and an image capturing device positioned above the inlet chute to capture an image of an identification number associated with a firearm and movable to be positioned above the cutting chamber to record destruction of the firearm inserted into the cutting chamber.

17. The method of claim 16 further comprising the step of activating the image capturing device.

18. The method of claim 16 further comprising the step of providing a computer system connected to the image capturing device for recording the image of the identification number associated with the firearm to be destroyed.

19. The method of claim 16 further comprising the step of providing a computer system connected to the image capturing device for recording the image of the firearm being destroyed within the cutting chamber.

20. The method of claim 16 further comprising the steps of turning on power to the pulverizer unit, providing a computer system connected to the image capturing device, activating the image capturing device, entering data related to the identification number associated with the firearm, starting recording of the image capturing device, recording the identification number by use of the first image capturing device, moving the image capturing device over the cutting chamber, recording destruction of the firearm in the cutting chamber by use of the image capturing device, viewing destruction of the firearm, and stopping recording of the destruction of the firearm.

* * * * *